United States Patent
Thoma et al.

(10) Patent No.: US 6,907,166 B2
(45) Date of Patent: Jun. 14, 2005

(54) CONTACTING AN OPTICAL WAVEGUIDE TO A DEVICE UNDER TEST

(75) Inventors: Peter Thoma, Rottenburg (DE); Emmerich Mueller, Aidllingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/446,214

(22) Filed: May 28, 2003

(65) Prior Publication Data

US 2004/0081401 A1 Apr. 29, 2004

(30) Foreign Application Priority Data

Oct. 29, 2002 (EP) .............................. 02024088

(51) Int. Cl.[7] .................................. G02B 6/26
(52) U.S. Cl. ..................... 385/38; 385/28; 385/48
(58) Field of Search .............................. 385/12, 28, 38, 385/43, 48, 49, 50, 123

(56) References Cited

U.S. PATENT DOCUMENTS

| | | | |
|---|---|---|---|
| 4,107,242 A | 8/1978 | Runge | 264/1.25 |
| 4,118,270 A | 10/1978 | Pan et al. | 216/24 |
| 4,671,609 A | 6/1987 | Khoe et al. | 385/33 |
| 5,926,594 A | 7/1999 | Song et al. | 385/49 |
| 6,741,776 B2 * | 5/2004 | Iwashita et al. | 385/49 |

FOREIGN PATENT DOCUMENTS

| | | |
|---|---|---|
| EP | 0 571 729 | 3/1993 |
| FR | 2 798 740 | 11/1998 |
| JP | 57084187 | 5/1982 |
| JP | 02006911 | 1/2001 |

OTHER PUBLICATIONS

Anderson, C., Examiner. European Search Report, Application Number EP 02 02 4088, dated Feb. 5, 2003.

* cited by examiner

Primary Examiner—Phan T. H. Palmer

(57) ABSTRACT

A setup for providing an optical contact adapted for guiding an optical signal comprises an optical waveguide being adapted for guiding the optical signal and comprising a tip on an end of the waveguide, wherein the tip comprises a transparent elastic material covering the end. A detector is provided for detecting a substantial alignment between the waveguide and an optical path within a device under test, and a first moving unit is used to move the waveguide laterally relative to a longitudinal direction of the waveguide and the device under test until the detector substantially detects the alignment. A second moving unit is adapted to reduce the distance between the tip and the device under test until the tip comes in physical contact with the device under test when the detector has detected alignment.

17 Claims, 3 Drawing Sheets

CONTACTING AN OPTICAL WAVEGUIDE TO A DEVICE UNDER TEST

BACKGROUND OF THE INVENTION

The present invention relates to providing an optical contact between an optical waveguide and a device under test.

SUMMARY OF THE INVENTION

It is an object of the invention to provide an improved optical contact between the optical waveguide and the device under test. The object is solved by the independent claims. Other preferred embodiments are shown by the dependent claims.

Providing a well-defined, e.g. refractive index matched and reliable, interface between the optical waveguide and the device under test (DUT) allows e.g. testing and measuring (such as optical waveguides or chip components—PLCs or hybrid components) with higher accuracy and performance.

Therefore, it is advantageous to reduce or even minimize reflections at the connection point/interface, between the waveguide and the DUT, to increase or even maximize a coupling efficiency at highest repeatability and lowest uncertainty between the waveguide and the DUT, and to have reduced or preferably no polarization dependency or distortion of state of polarization between waveguide and DUT. Embodiments of the present invention therefore at least partly provide these advantages and/or avoid the disadvantages of other possible solutions, as there are:

Physical contact solution, i. e. extremely precise manufactured joint between the waveguide and the DUT as well as highly accurate movements of the waveguide or the DUT to ensure proper physical contact between the two joined surfaces. The disadvantages of this solution can be the costs, the low reliability due to mechanical tolerances, and the potential of surface damages.

Index matching fluids solution, i. e. an index matching fluid is applied between the waveguide and the DUT to avoid index discontinuities, which can cause back reflections and interference ripple in the optical light path. The disadvantages of this solution can be the costs, the low reliability, and the fact that a contamination with liquids require additional cleaning procedures.

The non-matched probing solution, i. e. the waveguide and the DUT surface are not index matched due to an air gap between the waveguide and the DUT, so that the waveguide and the DUT surface are in distance to each other. The disadvantages can be a large index step between the material of the waveguide, air and the material of the DUT, high reflections, large interference effects, and an unstable connection between the waveguide and the DUT.

Preferred embodiments of the present invention are as follows:

A waveguide which is covered or in contact with a waveguide tip comprising an elastic or semi-elastic material, e. g. silicon or polyamide, which material provides optical properties, e. g. refractive index and propagation characteristics, similar to the material of the waveguide and the DUT.

A waveguide tip comprising with an elastic material is applied as a thin firm or a curved surface, e.g. a trop on the waveguide, preferably with focusing or defocusing properties in non-contact with the DUT. Pressed together it preferably acts as an film, as a elastic film stripe/band in between the waveguide and the DUT.

A tip comprising elastic index matching material as part of the waveguide or as a separate part to be assembled with the waveguide.

In particular in case of a waveguide material refractive index which is different from a DUT material refractive index a waveguide end surface is coated with antireflective material so that the refractive index of the elastic waveguide tip is matched to the refractive index of the DUT.

The applied or attached material of the tip itself can act similar to an antireflective coating in terms of optical properties.

Preferably, the elastic material comprised in embodiments of the present invention should be more elastic than the material of the waveguide of the probe and/or the DUT. Even more preferred, the elastic material should be at least one magnitude more elastic than the waveguide of a probe and/or a DUT.

Waveguides according to preferred embodiments of the present invention can be used for launching and/or receiving optical signals.

Tips according to preferred embodiments of the present invention are defined as the end of an optical waveguide of a probe and/or a DUT.

Preferred methods according to the present invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF PREFERRED EMBODIMENTS OF THE INVENTION

Figure 1:
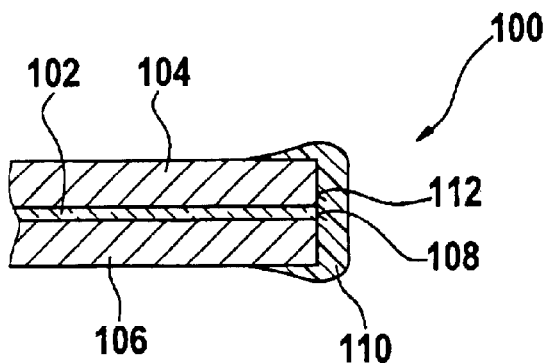
FIGS. 1–9 show schematic illustrations of embodiments of the present invention.

Referring now in greater detail to the drawings, FIG. 1 shows a first embodiment 100 of the present invention. Embodiment 100 comprises an optical fiber 102 providing an optical waveguide for guiding an optical signal. Fiber 102 is embedded in a cladding 104 thereby forming an optical probe 106. Fiber 102 has an end 108, which is covered by a flat coating of silicon 110 not only covering the end 108 but also covering face 112 of cladding 104. The silicon 110 is a transparent elastic material and provides a tip for the optical waveguide 102. The silicon 110 has roughly the same optical properties, e.g. refractive index and propagation characteristics, as the optical fiber 102. Therefore, the silicon 110 attached to the front end 108, 112 of the probe 106 acts similar as an antireflective coating of the front end 108, 112 of probe 106 in terms of optical properties.

Figure 2:
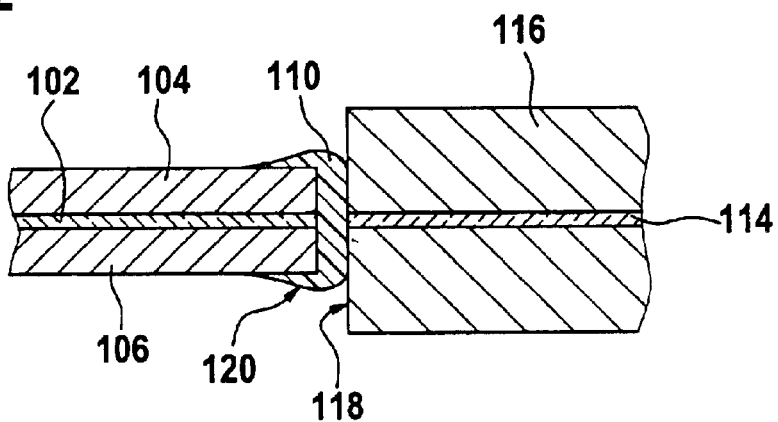

As can be seen in FIG. 2 the optical probe 106 can be used to establish an optical contact for guiding an optical signal between the optical waveguide 102 and an optical path 114 within a DUT 116. To establish this optical contact tip 110 is pressed against a front end 118 of DUT 116 to provide mechanical contact between the surface 120 of tip 110 and the front surface 118. Since tip 110 substantially consists of transparent and elastic silicon it can provide a good mechanical contact to DUT 116 without damaging surface 118. Thereby, any air gaps between probe 106 and DUT 116 are avoided. Therefore, no jumps of the refractive index along the path of an optical signal traveling through fiber 102, tip 110 and then through optical path 114 can occur. To the contrary the refractive index changes only smoothly along the aforementioned path.

If there is a huge difference between the refractive index of optical path 114 and of fiber 102 the front end 108, 112 of probe 106 can be coated with an anti-reflective coating prior to applying the silicon 110 to the front end 108, 112. Additionally, tip 110 can be provided with a refractive index matched to the refractive index of optical path 114 of DUT 116.

Probe 106 according to embodiment 100 is provided with tip 110 by dipping the front end 108, 112 into a small quantity of silicon having low viscosity. This results in a flat covering of front end 108, 112 by silicon 110.

Figure 3:
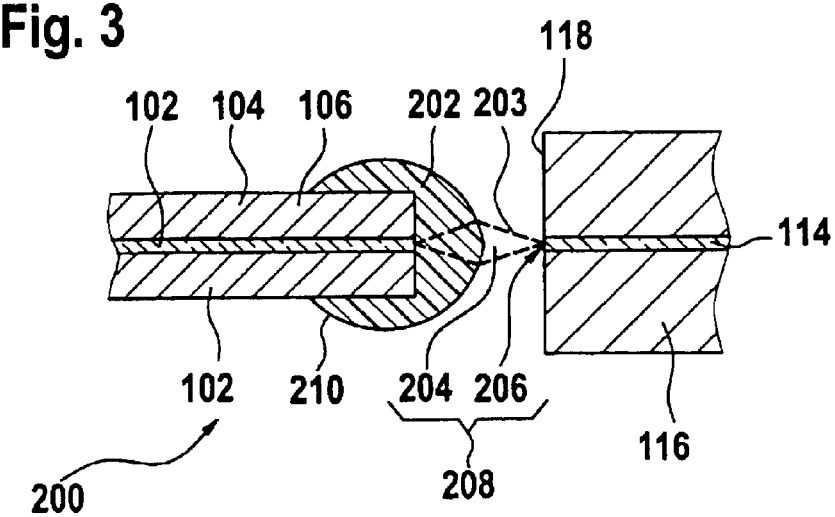

As an alternative the elastic material can be applied to the front end 108, 112 by dipping the front end 108, 112 into a large quantity of silicon with high viscosity. This manufacturing process provides a tip 202 according to embodiment 200 of FIG. 3. Tip 202 has the form of a lens. Thereby it is possible to use tip 202 to align the longitudinal direction of fiber 102 with the longitudinal direction of optical path 114 of DUT 116. Embodiment 200 can be used in a setup which contains a not shown detector for detecting a substantial alignment between waveguide 102 and optical path 114, a not shown first moving unit to move the waveguide 102 laterally relative to a longitudinal direction of waveguide 102 and DUT 116 until the detector substantially detects the alignment. This is possible because according to the schematic illustration of the path 203 of light 204 leaving tip 202 light 204 can be focused on a focal point 206 on surface 118 until the focal point 206 hits optical path 114 of DUT 116 and therefore a detector connected to optical path 114 can detect light 204.

Figure 4:
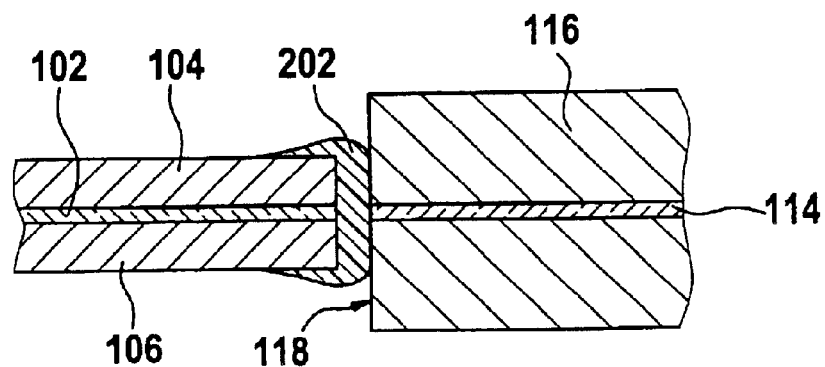

As can be seen from FIG. 4 a not shown second moving unit can then reduce the distance 208 between the tip 202 and the DUT 116 until the tip 202 comes in physical contact with the DUT 116. During the longitudinal movement of probe 106 to DUT 116 the not shown detector can always control the lateral position of waveguide 102 and can induce countermeasures if waveguide 102 tends to leave alignment to optical path 114. By reducing the distance 208 tip 202 elastically warps so that deformation of the initially lensed surface 210 of tip 202 into a flat layer according to FIG. 4 occurs resulting in a disenablement of the defocusing and focusing properties of tip 202. As a result tip 202 can again act as a refractive index matching material between probe 106 and DUT 116.

FIGS. 5–9 show further embodiments 300 to 700 of the present invention. Embodiments 300 to 700 show preferred shapes of tips and preferred manufacturing methods to manufacture probe 106.

Figure 5:
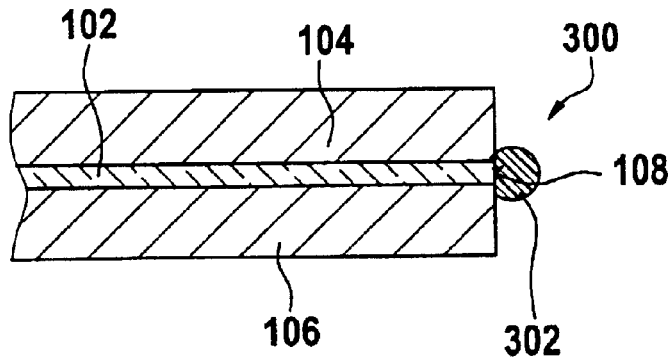

According to embodiment 300 of FIG. 5 probe 106 contains a tip 302 having the shape of a drop. Tip 302 is positioned on the front end surface 108 of fiber 102. Tip 302 is manufactured by dispensing silicon on the front end 108 of probe 106.

Figure 6:
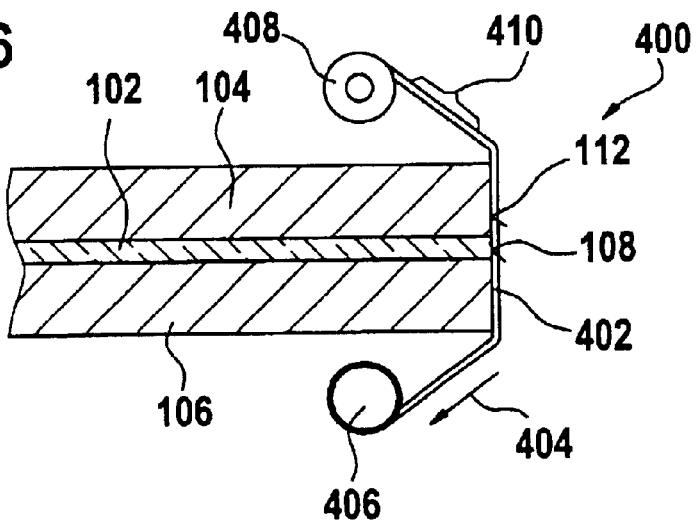

According to embodiment 400 of FIG. 6 there is provided a tip 402 in the shape of a tape, which can be moved along the front end 108, 112 of probe 106. Tip 402 can be moved along front end 108, 112 according to arrow 404 and can be rolled up on a drum 406. Another drum 408 provides fresh tape 402 so that it is always possible to replace tape 402 on top of front end 108 of waveguide 102 to always have clean tape 402 at this position. In an alternative embodiment it is also possible to have different refractive indices in different parts 410 of tape 402. Having this kind of tape 402 it is possible to adapt the probe 106 to different DUTs 116 having different refractive indices.

Figure 7:
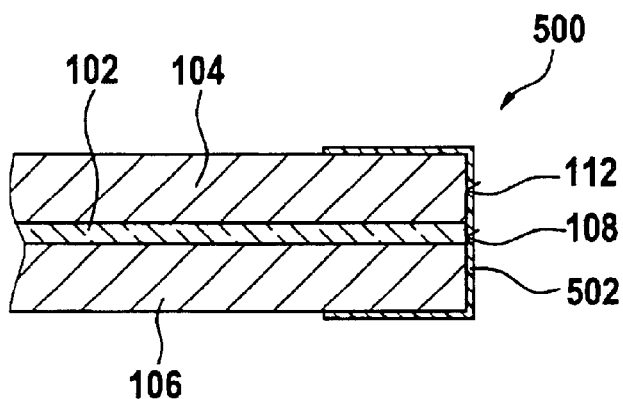
Figure 8:
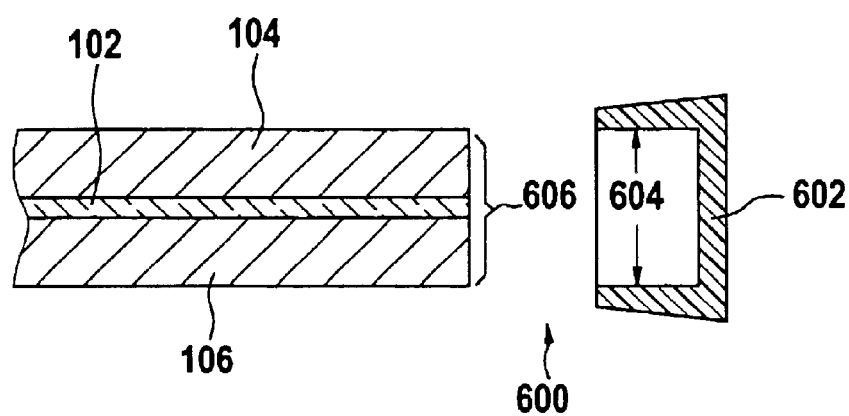

According to embodiment 500 of FIG. 7 a tip 502 is sprayed on front end 108, 112. According to embodiment 600 of FIG. 8 a tip 602 is provided as a molded part having an inner diameter 604 similar to a diameter 606 of probe 106.

Figure 9:
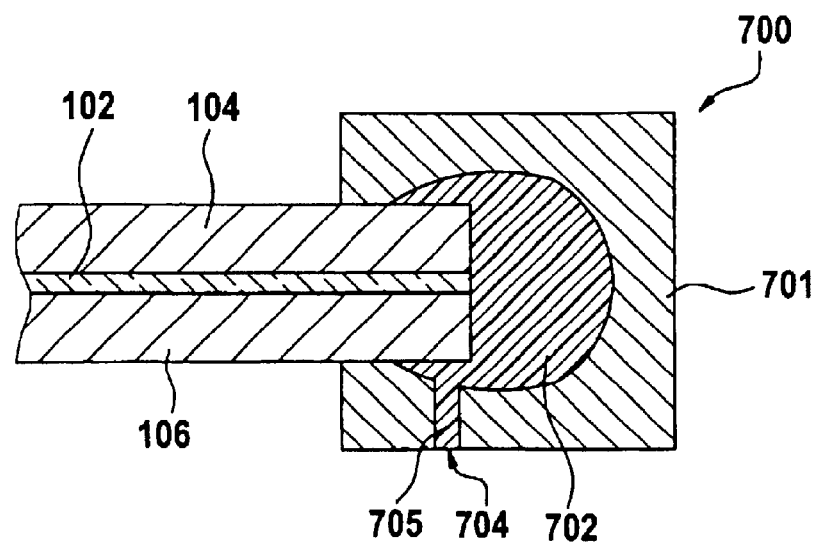

According to an embodiment 700 of FIG. 9 it is possible to manufacture a tip 702 having a shape similar to tip 110 of embodiment 100 of FIG. 1 by providing a tool 701 in which silicon can be injected through an injection opening 704 and an injection channel 705. After curing of the silicon the tool 701 can be removed.

What is claimed is:

1. A setup for providing an optical contact adapted for guiding an optical signal, the setup comprising:

an optical waveguide being adapted for guiding the optical signal and comprising a tip on an end of the waveguide, wherein the tip comprises a transparent elastic material covering the end, a detector adapted for detecting a substantial alignment between the waveguide and an optical path within a device under test, a first moving unit adapted to move the waveguide laterally relative to a longitudinal direction of the waveguide and the device under test until the detector substantially detects the alignment, and a second moving unit adapted to reduce the distance between the tip and the device under test until the tip comes in physical contact with the device under test when the detector has detected alignment.

2. The setup of claim 1, wherein the tip comprises:

a material reversibly movable into different positions relative to the waveguide.

3. The setup of claim 2, wherein the material has at least two sections with different refractive indices.

4. A method for manufacturing an optical waveguide to be used in the setup according to claim 1, the method comprising at least one of the steps of:

spraying the material on at least an end of an optical fiber comprising the waveguide;

dispensing the material on at least an end of an optical fiber comprising the waveguide;

dipping an optical fiber comprising the waveguide in the material;

assembling a pre-molded part of the material to an optical fiber comprising the waveguide; and introducing an optical fiber comprising the waveguide in a tool for providing a predetermined shape for the tip, injecting the material for the tip in the tool, and removing the tool after curing of the material.

5. The method of claim 4, wherein the material is selected from the group consisting of a large quantity of a high viscous material, and a small quantity of a low viscous material.

6. The setup of claim 1, wherein the tip comprises:
a material having a similar refractive index as the waveguide.

7. The setup of claim 1, wherein the tip comprises:
an elastic material being more elastic than a material of the waveguide.

8. The setup of claim 1, wherein the tip comprises:
a material having focusing or defocusing properties with respect to the optical signal.

9. The setup of claim 1, wherein the tip comprises a material having a shape selected from the group consisting of:
a coating of the waveguide, a film on the waveguide, a film having a thickness being relatively small with respect to the thickness of the waveguide, and any combinations thereof.

10. The setup of claim 1, wherein the tip comprises:
a material having a refractive index at least being substantially insensitive to a deformation of the material in longitudinal direction of the waveguide.

11. The setup of claim 1, wherein the tip comprises:
an elastic material being at least one magnitude more elastic than a material of the waveguide.

12. The setup of claim 1, wherein the tip comprises a material selected from the group consisting of: silicon, polyamide, and a combination thereof.

13. The setup of claim 1, wherein the tip comprises:
a material having antireflective properties with respect to the signal.

14. A method for providing an optical contact adapted for guiding an optical signal between an optical waveguide and a device under test, wherein the optical waveguide comprises a tip on an end of the waveguide, and the tip comprises a transparent elastic material covering the end, the method comprising the steps of:

detecting a substantial alignment between the waveguide and an optical path within the device under test, moving the waveguide laterally relative to a longitudinal direction of the waveguide and the device under test until the alignment is substantially detected, and reducing the distance between the tip and the device under test until the tip comes in physical contact with the device under test when the alignment is substantially detected.

15. A method for providing an optical contact adapted for guiding an optical signal between an optical waveguide and a device under test, wherein the optical waveguide comprises a tip on an end of the waveguide, and the tip comprises a transparent elastic material covering the end, the method comprising the steps of:

using the tip of the waveguide not in contact with the device under test to align the waveguide with an optical path in the device under test by using focusing or defocusing properties of the tip.

16. The method of claim 15, comprising the steps of:
when detecting alignment between the waveguide and the optical path of the device under test, reducing a distance between the tip and the device under test until the tip comes in physical contact with the device under test.

17. The method of claim 16, comprising the step of:
reducing the distance between the waveguide and the device under test until focusing or defocusing properties of the tip have substantially disappeared.

* * * * *